US012812117B2

(12) United States Patent
Zhao et al.

(10) Patent No.: US 12,812,117 B2
(45) Date of Patent: Nov. 24, 2026

(54) TILE AVERAGING AND FRAME AVERAGING FOR FRAME CONTEXT INITIALIZATION

(71) Applicant: Tencent America LLC, Palo Alto, CA (US)

(72) Inventors: Liang Zhao, Palo Alto, CA (US); Shan Liu, Palo Alto, CA (US); Madhu Peringassery Krishnan, Palo Alto, CA (US); Ting-Lan Lin, Palo Alto, CA (US); Tianqi Liu, Palo Alto, CA (US); Jayasingam Adhuran, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 30 days.

(21) Appl. No.: 19/201,835

(22) Filed: May 7, 2025

(65) Prior Publication Data

US 2026/0136012 A1 May 14, 2026

Related U.S. Application Data

(60) Provisional application No. 63/720,082, filed on Nov. 13, 2024.

(51) Int. Cl.
*H04N 19/70* (2014.01)
*H04N 19/105* (2014.01)
(Continued)

(52) U.S. Cl.
CPC ........... *H04N 19/13* (2014.11); *H04N 19/105* (2014.11); *H04N 19/172* (2014.11); *H04N 19/70* (2014.11)

(58) Field of Classification Search
CPC ..... H04N 19/70; H04N 19/105; H04N 19/176
See application file for complete search history.

(56) References Cited

U.S. PATENT DOCUMENTS 9,167,260 B2 * 10/2015 Schmit .................. H04N 19/43
9,392,280 B1 7/2016 Bankoski et al.
(Continued)

OTHER PUBLICATIONS

Weighted angular prediction; Panusopone —Apr. 2017; (Year: 2017).*
(Continued)

*Primary Examiner* — Luis Perez-Fuentes
(74) *Attorney, Agent, or Firm* — Morgan, Lewis & Bockius LLP

(57) ABSTRACT

An example method of video decoding includes receiving a video bitstream comprising a plurality of frames, and selecting a primary reference frame for a current frame of the plurality of frames. When the primary reference frame has less than a threshold number of tiles, the method includes selecting a secondary reference frame from the set of reference frames, obtaining respective contexts for the primary and secondary reference frames, and initializing a current frame context for the current frame by performing a weighted average of the respective contexts. When the primary reference frame has more than the threshold number of tiles, the method includes initializing the current frame context for the current frame without using the secondary reference frame. The method also includes entropy decoding one or more syntax elements using the current frame context, and reconstructing the current frame using information of the one or more syntax elements.

20 Claims, 7 Drawing Sheets

(51) Int. Cl.
*H04N 19/13* (2014.01)
*H04N 19/172* (2014.01)

(56) References Cited

U.S. PATENT DOCUMENTS

| | | | |
|---|---|---|---|
| 11,184,636 | B2 * | 11/2021 | Aono .................... H04N 19/563 |
| 12,323,627 | B2 * | 6/2025 | Laroche ................. H04N 19/70 |
| 2012/0293540 | A1 | 11/2012 | Feng et al. |
| 2013/0058409 | A1 | 3/2013 | Kadono et al. |
| 2017/0064313 | A1 | 3/2017 | Wu et al. |
| 2017/0214920 | A1 | 7/2017 | Wang |
| 2020/0236357 | A1 | 7/2020 | Ameres et al. |
| 2022/0007010 | A1 | 1/2022 | Van der Auwera et al. |
| 2023/0147843 | A1 | 5/2023 | Iyer et al. |
| 2026/0136026 | A1 * | 5/2026 | Zheng .................. H04N 19/174 |

OTHER PUBLICATIONS

Enhanced bi-directional motion compensation; Chen—Jan. 2022; (Year: 2022).*

An overview of core coding tools in the AV1 video coding; Chen—2018 (Year: 2018).*

Tencent America LLC, ISRWO, PCT/US2025/028768, Jul. 18, 2025, 14 pgs.

Yue Chen et al., "An Overview of Core Coding Tools in the AV1 Video Codec", 2018 Picture Coding Symposium (PCS), Jun. 2018, 5 pgs.

* cited by examiner

TILE AVERAGING AND FRAME AVERAGING FOR FRAME CONTEXT INITIALIZATION

RELATED APPLICATIONS

This application claims priority to U.S. Provisional Patent Application No. 63/720,082, entitled "Improved Tile Averaging and Frame Averaging for Frame Context Initialization," filed Nov. 13, 2024, which is hereby incorporated by reference in its entirety.

TECHNICAL FIELD

The disclosed embodiments relate generally to video coding, including but not limited to systems and methods for entropy coding and probability models.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes a set of methods for video (image) compression, including methods for switching probability models when entropy encoding and decoding data for a video bitstream. The probability models may be represented as cumulative density functions (CDFs) for an arithmetic coding. The probability models may be initiated based on coded information such that the probabilities for entropy coding are more accurate than probability models with default initialization values. In an example, a weighted average of respective probability models from multiple reference frames may serve as the initialized values for one or more contexts of current frame. Initializing a current frame context using a weighted average of contexts from reference frames can provide reduced signaling overhead (e.g., due to more efficient entropy coding) as well as improved coding accuracy (e.g., a more accurate context can provide better predictions). In an example, when there are multiple reference frames in the reference frame buffer and the primary reference frame is not equal to the derived reference frame, the primary reference frame and the derived primary reference frame may be selected to generate the weighted average of frame probability model. Selectively initializing a current frame using a weighted average of multiple references frames, or a single reference, improves coding accuracy and reduces signaling overhead. Additionally, selectively initializing a current frame using a weighted average of multiple references frames or a weighted average of multiple tiles in a single reference frame can improve coding accuracy and efficiency as compared to always using multiple reference frames and/or always using tile-based averaging.

In accordance with some embodiments, a method of video decoding includes (i) receiving a video bitstream (e.g., a coded video sequence) comprising a plurality of frames; (ii) selecting a primary reference frame from a set of reference frames for a current frame of the plurality of frames; (iii) when the primary reference frame has less than a threshold number of tiles: (a) selecting a secondary reference frame from the set of reference frames; (b) obtaining respective contexts for the primary reference frame and the secondary reference frame; and (c) initializing a current frame context for the current frame by performing a weighted average of the respective contexts; (iv) when the primary reference frame has more than the threshold number of tiles, initializing the current frame context for the current frame without using the secondary reference frame; (v) entropy decoding one or more syntax elements for the current frame using the current frame context; and (vi) reconstructing the current frame using information of the one or more syntax elements.

In accordance with some embodiments, a method of video decoding includes (i) receiving a video bitstream comprising a plurality of frames; (ii) selecting a primary reference frame from a set of reference frames for the current frame; (iii) for each tile in a plurality of tiles for a current frame of the plurality of frames: (a) when the primary reference frame has more than a threshold number of tiles, determining whether to apply tile averaging or frame averaging to initialize a context for the tile; (b) when using frame averaging to initialize the context for the tile: (1) selecting a secondary reference frame from the set of reference frames; (2) obtaining respective contexts for the primary reference frame and the secondary reference frame; and (3) initializing a context for the current frame by performing a weighted average of the respective contexts for the primary reference frame and the secondary reference frame; (c) when using tile averaging to initialize the context for the tile: (I) selecting two or more tiles from the primary reference frame; (II) obtaining respective contexts for the two or more tiles; and (III) initializing the context for the current frame by performing a weighted average of the respective contexts for the two or more tiles; (iv) entropy decoding one or more syntax elements for the tile using the context; and (v) reconstructing the tile using information of the one or more syntax elements.

In accordance with some embodiments, a method of video encoding includes (i) receiving video data (e.g., a source video sequence) comprising a plurality of frames; (ii) selecting a primary reference frame from a set of reference frames for a current frame of the plurality of frames; (iii) when the primary reference frame has less than a threshold number of tiles: (a) selecting a secondary reference frame from the set of reference frames; (b) obtaining respective contexts for the primary reference frame and the secondary reference frame; and (c) initializing a current frame context for the current frame by performing a weighted average of the respective contexts; (iv) when the primary reference frame has more than the threshold number of tiles, initializing the current frame context for the current frame without using the secondary reference frame; and (v) entropy encoding one or more parameters for the current frame using the current frame context.

In accordance with some embodiments, a method of processing visual media data includes (i) obtaining a source video sequence that comprises a plurality of frames; and (ii) performing a conversion between the source video sequence and a video bitstream of visual media data according to a format rule, where the video bitstream comprises a plurality of encoded frames; and where the format rule specifies that: (a) a primary reference frame is to be selected from a set of reference frames for a current frame of the plurality of frames; (b) when the primary reference frame has less than a threshold number of tiles: (1) a secondary reference frame is to be selected from the set of reference frames; (2) respective contexts are to be obtained for the primary reference frame and the secondary reference frame; and (3) a current frame context is to be initialized for the current frame by performing a weighted average of the respective contexts; (c) when the primary reference frame has more than the threshold number of tiles, the current frame context is to be initialized for the current frame without using the secondary reference frame; (d) one or more syntax elements are to be entropy decoded for the current frame using the current frame context; and (e) the current frame is to be reconstructed using information of the one or more syntax elements.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes a set of methods for video (image) compression, including methods for initializing probability models. The initialization of a probability model can occur in the middle of an encoding and decoding process. For example, initialization may occur at the beginning of a sequence, a group of pictures (GOP), a frame, for each coding block, for each partition, and/or for each transform block. As an example, a context for a current frame may be initialized (1) by performing a weighted average of contexts from multiple reference frames when a primary reference frame has less than a threshold number of tiles, and (2) by performing a weighted average of contexts from multiple tiles of the primary reference frame when the primary reference frame has more than a threshold number of tiles. Selectively applying tile-based averaging or frame-based averaging based on the number of tiles can improve coding accuracy and efficiency as compared to always applying tile-based averaging and/or always applying frame-based averaging.

Example Systems and Devices

Figure 1:
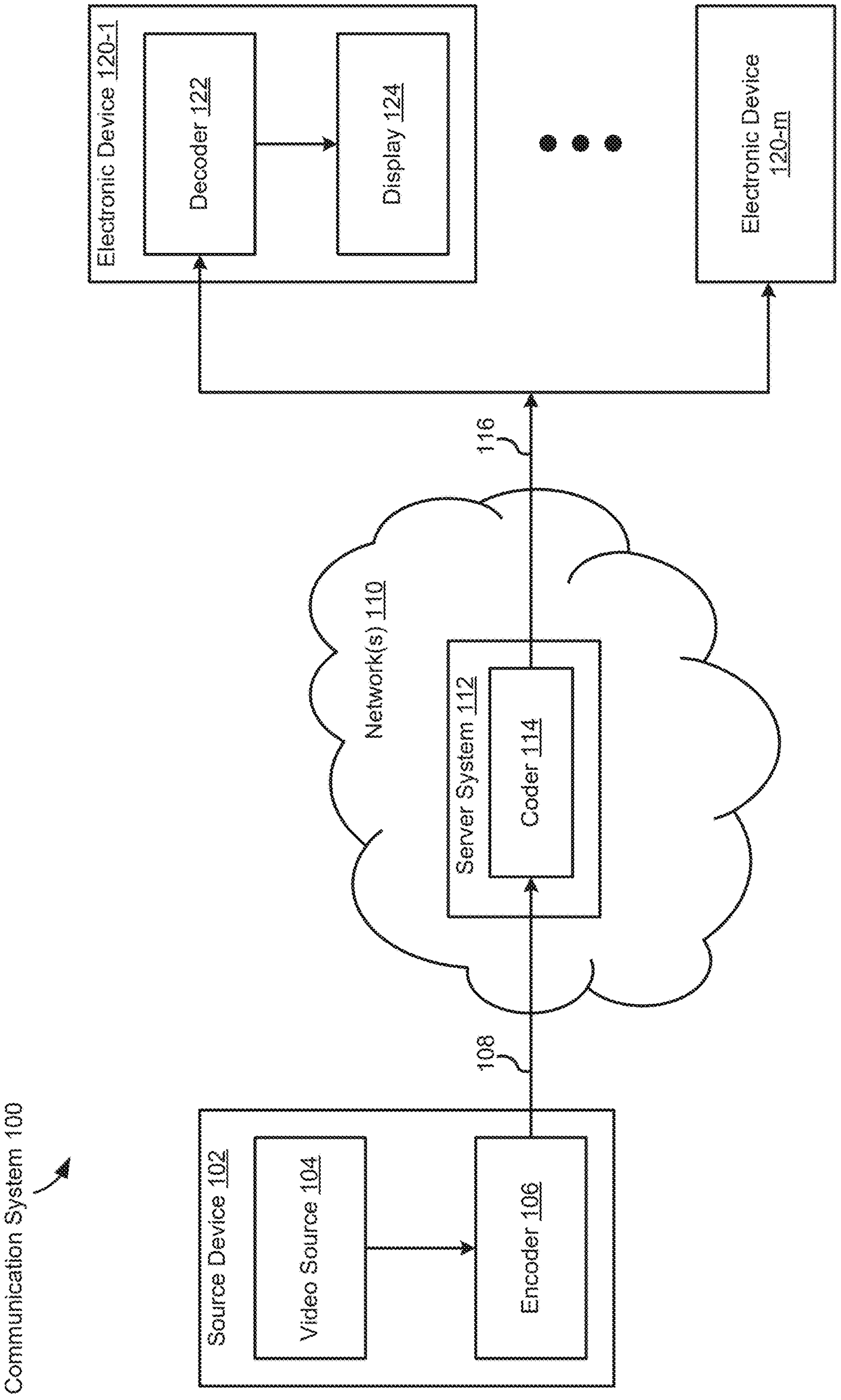
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including, e.g., wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116. In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
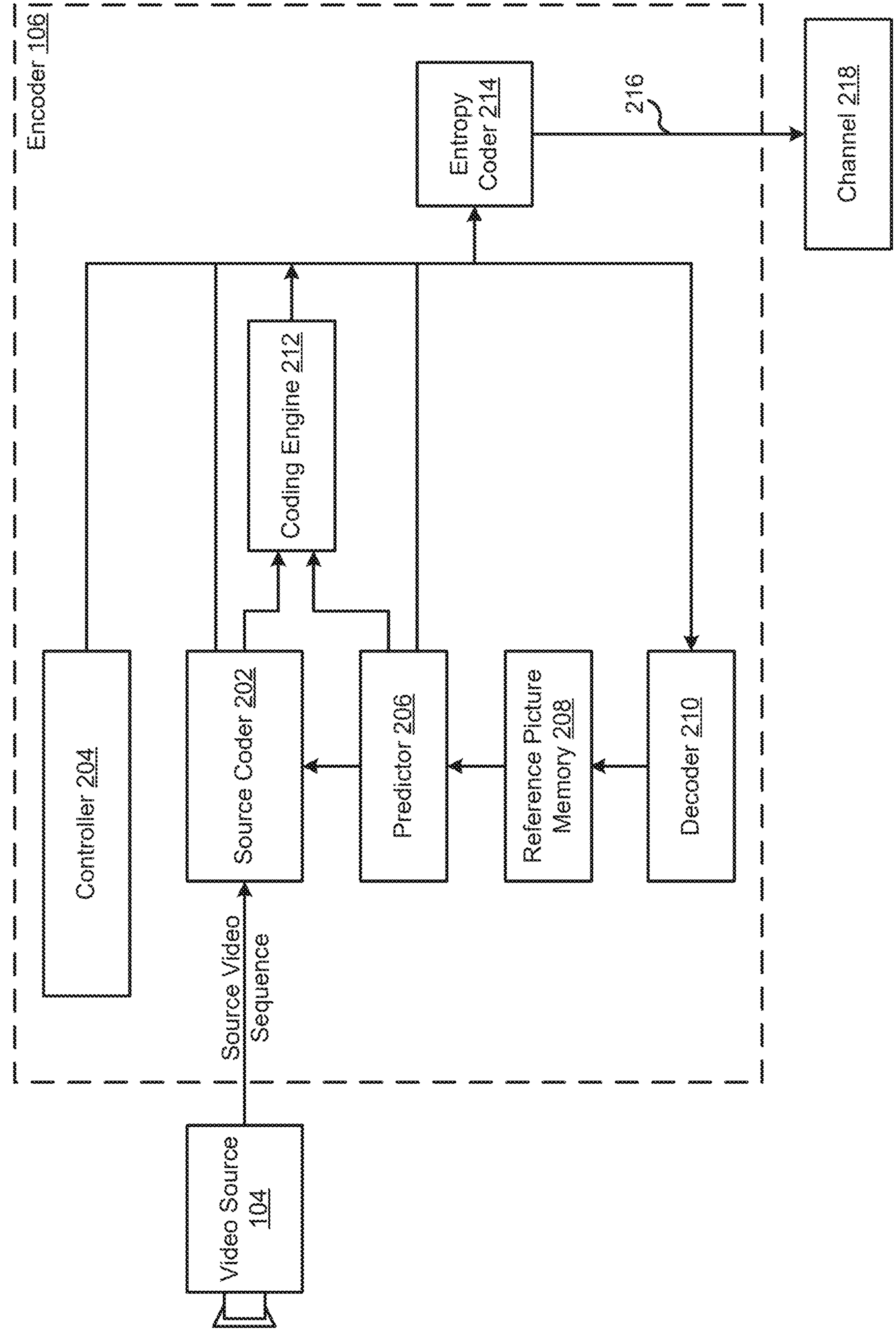
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, e.g., setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (e.g., blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
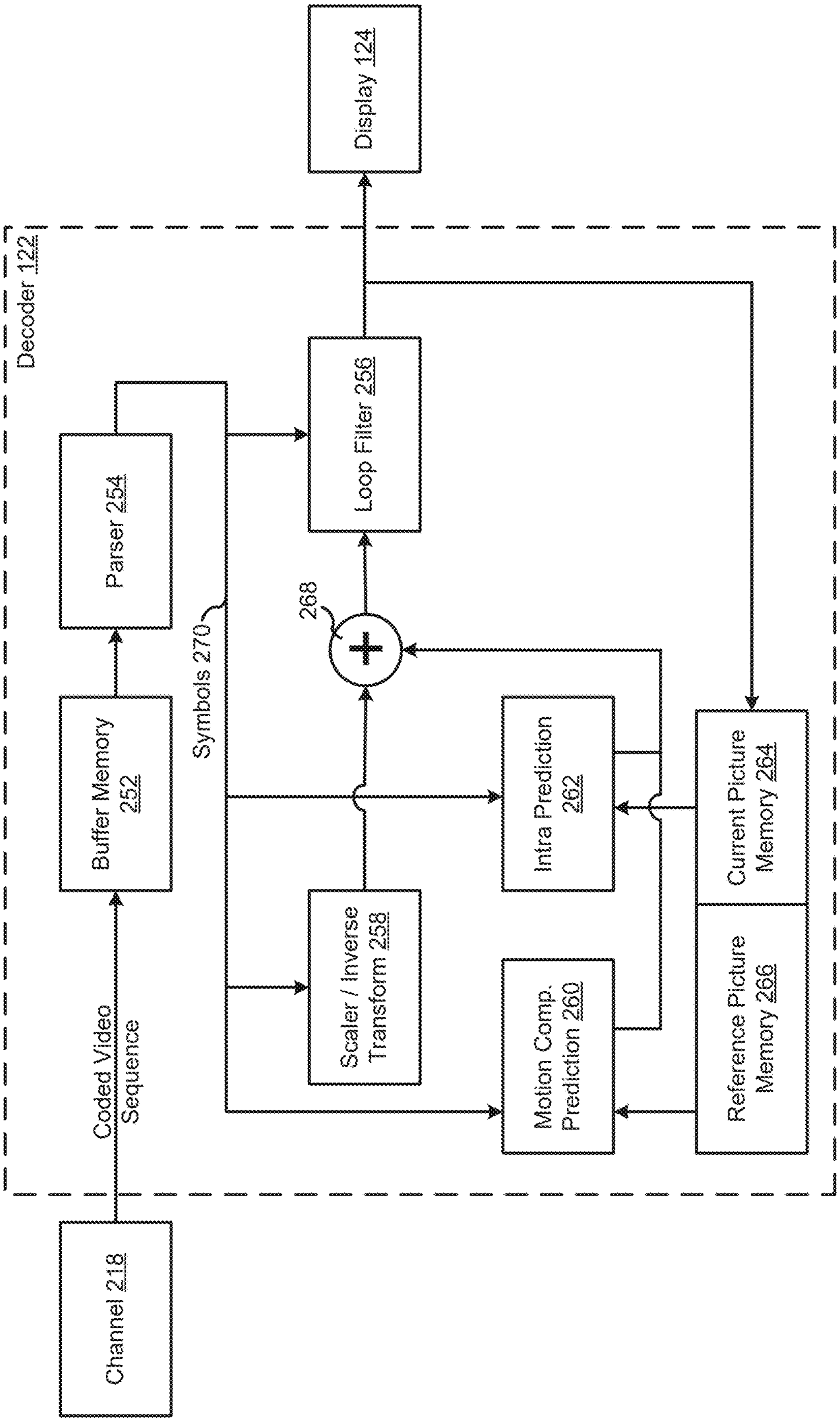
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, e.g., coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, e.g., information used to manage operation of the decoder component 122, and/or information to control a rendering device such as the display 124. The control information for the rendering device(s) may be in the form of, e.g., Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, e.g., X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (e.g., by parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. Levels may restrict the maximum picture size, maximum frame rate, maximum reconstruction sample rate (measured in, e.g., megasamples per second), maximum reference picture size, and so on. Limits set by levels may be further restricted through Hypothetical Reference Decoder (HRD) specifications and metadata for HRD buffer management signaled in the coded video sequence.

Figure 3:
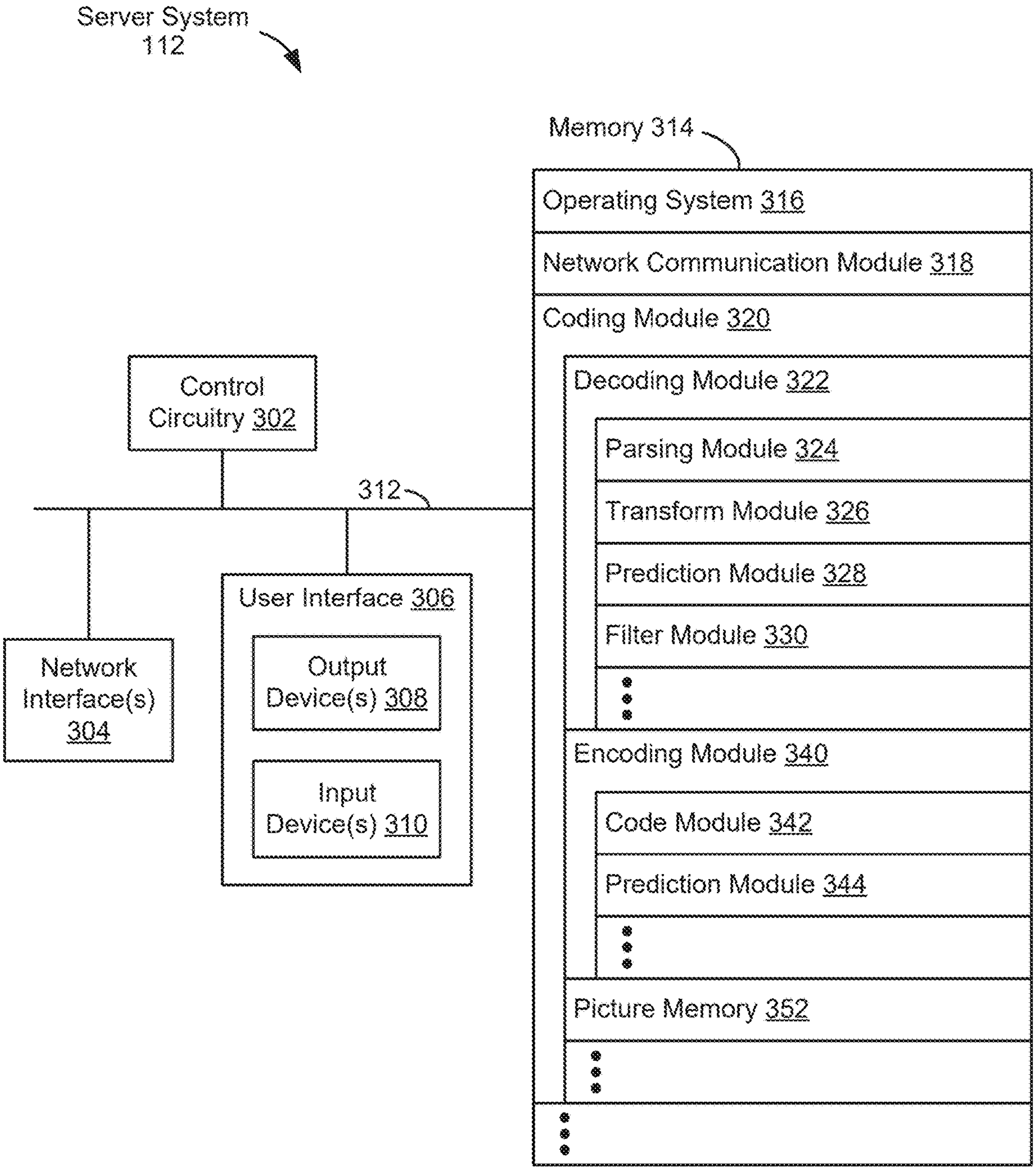
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120).

As mentioned previously, the present disclosure covers entropy encoding and probability model initialization. Entropy coding in video codecs uses context-based (e.g., conditional) probabilities so that the symbols can be coded with one or more probability models that can best capture the statistics governed by a condition or higher order conditions.

As used herein, the term "probability model" (sometimes referred to as a "symbol probability model") refers to any aspect about deriving the probability of a symbol during entropy coding, which is used to determine the output of a context-based arithmetic coding engine. Examples of design aspects of probability model can include the context initialization probability/state, probability update window size/speed, context derivation process, number of contexts, number of windows, or codewords.

The term "block" may refer to a coding tree block, the largest coding block, a predefined fixed block size, coding block, prediction block, residual block or transform block.

In some embodiments, a default mode is encoded without performing a search for a better mode decision (e.g., a more coding efficient decision). The default mode may be used when an encoder does not have enough computing power to perform the search and/or determine a better mode. The probability model option to encode this default mode can be designed so that it can best encode the default mode.

In some embodiments, the initialization or adaption of a probability model can occur at any place in the middle of encoding and/or decoding, e.g., at the beginning of a sequence, at the beginning of a group of pictures (GOP), at the beginning of a frame, for each coding block, for each partition, and/or for each transform block. The group of symbol probability models associated with an entire frame may be referred to as a "frame context" (or "tile context").

Figure 4A:
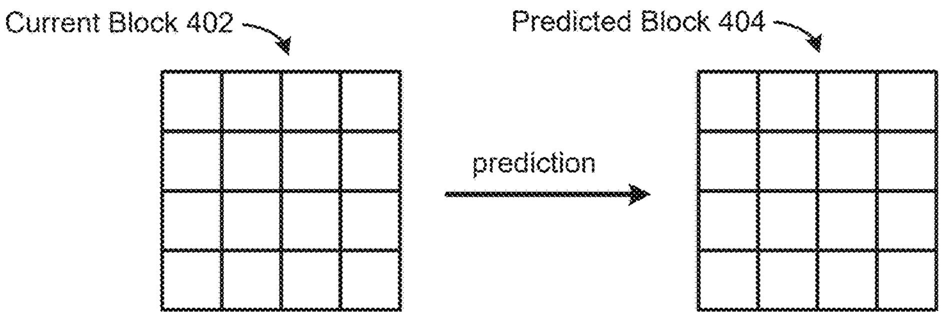
FIGS. 4A-4C illustrate example prediction blocks, residual blocks, and reconstructed blocks according to some embodiments.
Figure 4B:
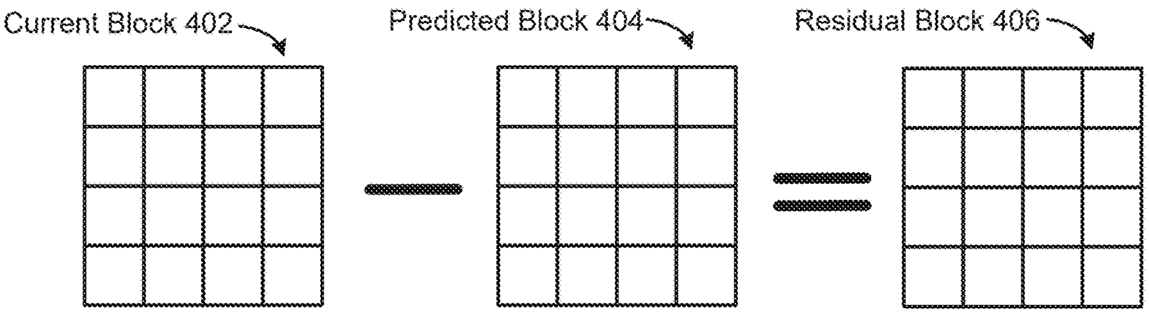
Figure 4C:
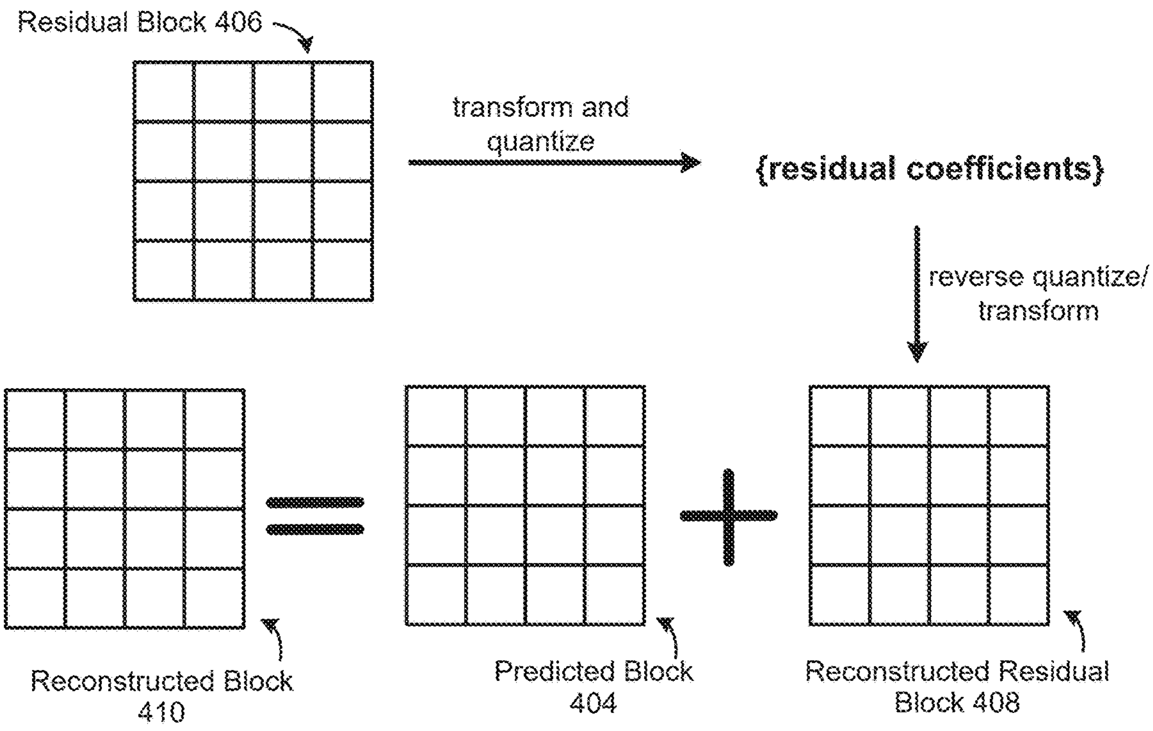

Turning now to example encoding and decoding using prediction and residual blocks, FIG. 4A illustrates the computation of a prediction block in accordance with some embodiments. In the example of FIG. 4A, an intra prediction is performed on a current block 402 to generate a predicted block 404. In some embodiments, an inter prediction is performed to generate the predicted block. The current block 402 includes a set of samples (e.g., pixel blocks) and the prediction block 404 includes a set of predictions that correspond to the set of samples. FIG. 4B illustrates the computation of a residual block in accordance with some embodiments. As shown in FIG. 4B, the prediction block 404 is subtracted from the current block 402 to generate a residual block 406 that includes a set of residues. For example, respective differences are calculated between each sample and the corresponding prediction. FIG. 4C illustrates the computation of a reconstructed block in accordance with some embodiments. As shown in FIG. 4C, the residual block 406 undergoes one or more transformations and quantization to generate a set of residual coefficients. The set of residual coefficients may be transmitted from an encoder component to a decoder component as part of a video bitstream. The set of residual coefficients undergo a reverse quantization and reverse transformation to generate a reconstructed residual block 408. The reconstructed residual block 408 is combined with the predicted block 404 (e.g., reconstructed residues of the reconstructed residual block 408 are added to predictions of the prediction block 404) to generate a reconstructed block 410 corresponding to the current block 402.

The coefficients and other coding parameters are signaled in the video bitstream. The signaling may involve bypass coding, arithmetic coding, and/or other types of coding (e.g., to reduce signaling overhead). Some systems use a tree-based Boolean non-adaptive binary arithmetic encoder to encode syntax elements for a video bitstream.

The entropy coding in modern codecs have been widely using the context-based (e.g., conditional) probabilities so that the symbols can be coded with probability model that can best capture the statistics governed by a condition or higher order conditions. Some systems employ an adaptive multi-symbol (M-ary) arithmetic coder (e.g., a symbol-to-symbol adaptive encoder). For example, each syntax element may be a member of a specific alphabet of N elements, and a corresponding context consists of a set of N probabilities together with a count, e.g., to facilitate fast early adaptation. The higher precision (as compared to a binary arithmetic encoder) allows for accurate tracking probabilities of less common elements of an alphabet. Probabilities may be adapted by simple recursive scaling, with an update factor based on the alphabet size.

Some systems use M-ary symbol arithmetic coding techniques to compress the syntax elements. In some embodiments, the probability model for arithmetic coding is updated per coded symbol. A cumulative distribution function (CDF) may be used to represent the probability that a random variable may take a value that is less than or equal to a particular threshold value. For example, some codecs store M-ary symbol probabilities in the form of CDFs. Arithmetic coding may directly use the CDFs to compress symbols. For example, for an M-ary random variable whose probability mass function (PMF) at time n may be defined as shown below in Equation 1.

Example PMF $$\overline{P}_n = [p_1(n), p_2(n), \ldots, p_M(n)] \quad \text{Equation 1}$$

The corresponding CDF may be defined as shown below in Equation 2.

Example CDF $$\overline{C}_n = [c_1(n), c_2(n), \ldots, c_{M-1}(n), 1] \quad \text{Equation 2}$$

where $$c_k(n) = \sum_{i=1}^{k} p_i(n).$$

The elements in Equation 2 may be scaled (e.g., by $2^{15}$) for integer precision.

In this example, when the symbol is coded, a new outcome $k \in \{1, 2, \ldots, M\}$ is observed and the probability model may be updated as shown below in Equation 3.

Example Probability Model Update $$\overline{P}_n = \overline{P}_{n-1}(1-\alpha) + \alpha\overline{e}_k \quad \text{Equation 3}$$

where $\overline{e}_k$ is an indicator vector whose k-th element is 1 and the other elements are 0, and a is the update rate for the probability model. The CDF may be updated as shown below in Equation 4.

Example CDF Update $$c_m(n) = \begin{cases} c_m(n-1)\cdot(1-\alpha), & m < k \\ c_m(n-1) + \alpha\cdot(1 - c_m(n-1)), & m \geq k \end{cases} \quad \text{Equation 4}$$

The M-ary symbol arithmetic coding may scale all the floating-point data by $2^{15}$ and represented by 15-bit unsigned integers. Some implementations employ a dual model approach to allow the involved multiplications fit in 16 bits. For example, the probability model CDF is updated and maintained at 15-bit precision, but when it is used for entropy coding, only the most significant 9 bits may be fed into the arithmetic coder.

As described previously, the initialization of a probability model can occur at various places during encoding and decoding. The initialization may use a reference context to generate more accurate probabilities than default initialization values would provide. In some embodiments, the reference context is obtained from a reference frame for the current frame.

Figure 5A:
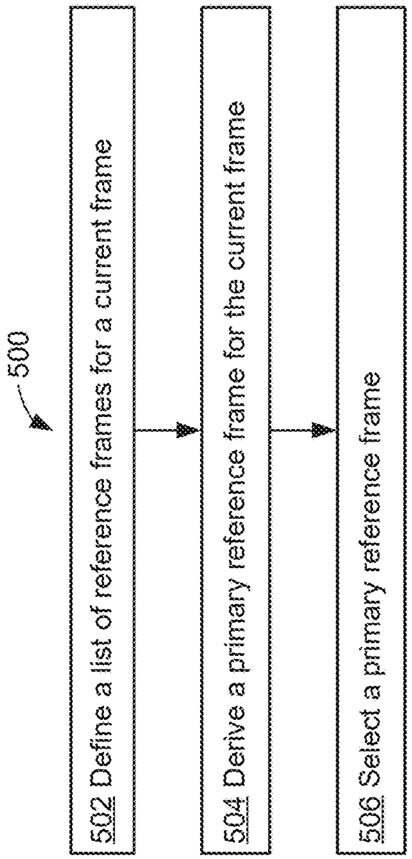
FIG. 5A illustrates an example primary reference frame selection process in accordance with some embodiments.

FIG. 5A illustrates an example primary reference frame selection process in accordance with some embodiments. The method 500 of FIG. 5A may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system (e.g., an encoding component or decoding component of the system) defines (502) a list of reference frames for the current frame. Each reference frame's context(s) may be stored along with the frame data.

The system derives (504) a primary reference frame for the current frame. This primary reference frame is sometimes referred to as the "derived primary reference frame." An encoding component and corresponding decoding component derive the same primary reference frame using the available coded data (e.g., previously-decoded data) and one or more predefined rules.

The system selects (506) a primary reference frame. For example, an encoding component may perform additional testing of each reference frame to confirm whether the derived primary reference frame is the optimal reference frame (e.g., has the lowest associated cost). In some embodiments, the encoding component signals, via a video bitstream, whether the derived primary reference frame is the optimal reference frame. In some embodiments, the encoding component signals an index of the optimal reference frame in the list of reference frames. For example, if the derived primary reference frame is the same as the optimal primary reference frame, signal 0 (or 1), otherwise signal 1 (or 0). A context of the primary reference frame may be used to initialize contexts for current frame. In some embodiments, frame context initialization employs a weighted average of two reference frames' contexts. For example, one reference frame is the selected primary reference frame and another is selected as the second reference frame. In some embodiments, the encoder decides and signals the primary reference frame in the frame header, which is used for starting frame contexts for the frame. For the signaling of the primary reference frame, one flag may be signaled to indicate whether it is the same as the derived primary reference frame. If yes, the primary reference frame is set to the derived primary reference frame. Otherwise, the optimal reference frame may be signaled.

Figure 5B:
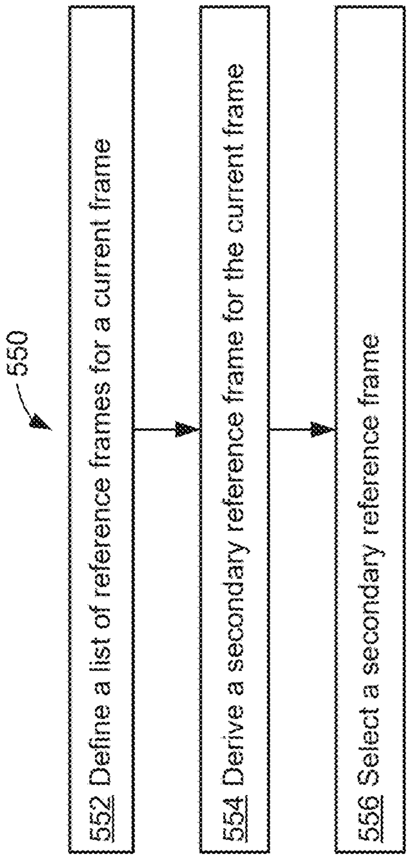
FIG. 5B illustrates an example secondary reference frame selection process in accordance with some embodiments.

FIG. 5B illustrates an example secondary reference frame selection process in accordance with some embodiments. The method 550 of FIG. 5B may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system. In some embodiments, the method 550 is performed by a same system as the method 500 described above.

The system (e.g., an encoding component or decoding component of the system) defines (552) a list of reference frames for the current frame. Each reference frame's context(s) may be stored along with the frame data. The same list of reference frames may be used to identify the primary and secondary reference frames.

The system derives (554) a secondary reference frame for the current frame. This secondary reference frame is sometimes referred to as the "derived secondary reference frame." An encoding component and corresponding decoding component derive the same secondary reference frame using the available coded data (e.g., previously-decoded data) and one or more predefined rules.

In some embodiments, the reference frame with the lowest index in the reference frame buffer, positioned on the same side as the primary reference frame is used as the second reference frame. Table 1 below illustrates the improvements to signal-to-noise ratio and coding time based on simulations performed using current designs (e.g., AVM research-v8) with various video data (e.g., representing AOM Test Conditions).

TABLE 1

Simulation Results

| | Y-PSNR | U-PSNR | V-PSNR | YUV-PSNR | Enc-time | Dec-time |
|---|---|---|---|---|---|---|
| Random Access | −0.11% | −0.36% | −0.20% | −0.13% | 98% | 95% |
| Low Delay | −0.01% | 0.01% | | −0.04% | 100% | 99% |

In some embodiments, a selected secondary reference frame is used as the second reference frame (e.g., the secondary reference frame is signaled in the video bitstream). Table 2 below illustrates the improvements to signal-to-noise ratio based on simulations performed using current designs (e.g., AVM research-v8) with various video data (e.g., representing AOM Test Conditions).

TABLE 2

Simulation Results

| | Y-PSNR | U-PSNR | V-PSNR | YUV-PSNR | Enc-time | Dec-time |
|---|---|---|---|---|---|---|
| Random Access | −0.17% | −0.26% | −0.19% | −0.18% | 102% | 100.7% |

The system selects (556) a secondary reference frame. For example, an encoding component may perform additional testing of each reference frame to confirm whether the derived secondary reference frame is the optimal reference frame (e.g., has the lowest associated cost). In some embodiments, the encoding component signals, via a video bitstream, whether the derived secondary reference frame is the optimal secondary reference frame. In some embodiments, the encoding component signals an index of the optimal secondary reference frame in the list of reference frames.

In some embodiments, when a frame is encoded with multiple tiles, the CDFs of multiple tiles are averaged (as opposed to using only one tile's CDFs) for the final CDFs for the frame. Using averaged CDFs can improve coding accuracy, which enhances coding efficiency. In some embodiments, a simple averaging algorithm is utilized to compute the average value of the CDFs from the tiles (e.g., to simplify hardware implementation). In some embodiments, a weighted averaging algorithm is utilized. In some embodiments, only shift and sum operations are used to compute the average value of the CDFs.

Figure 6A:
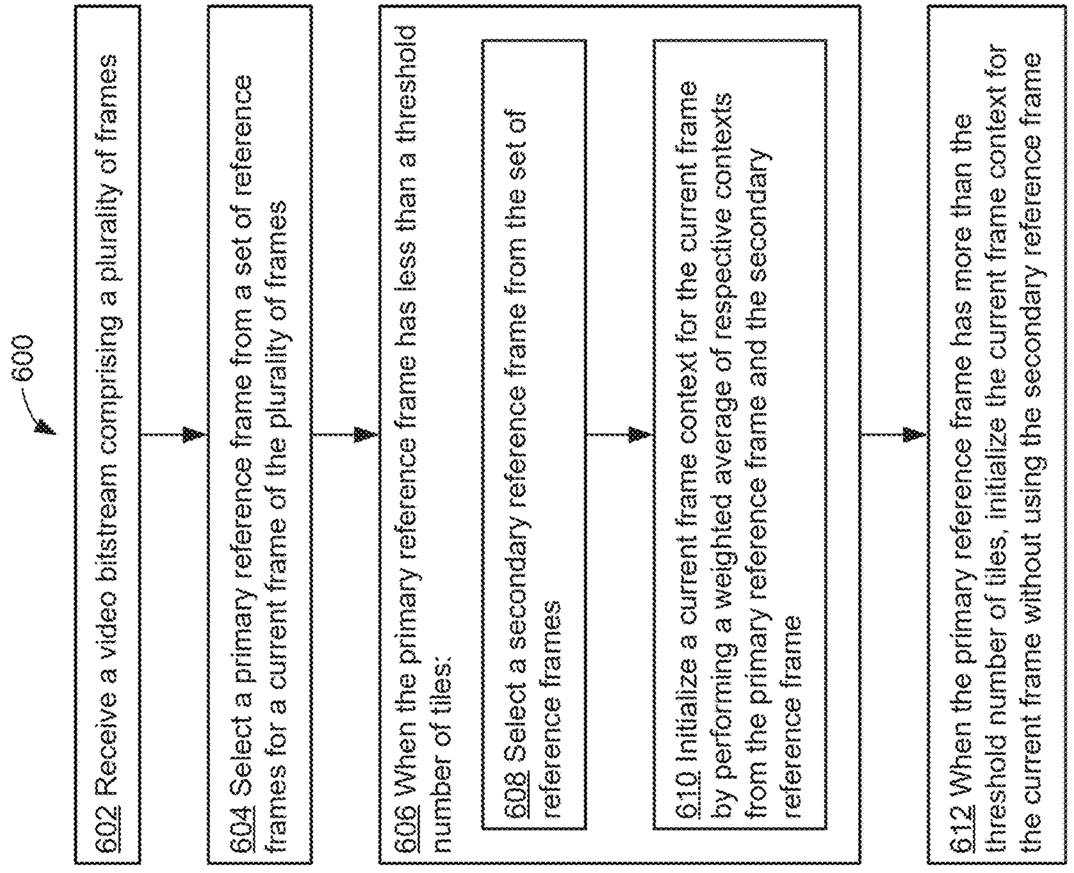
FIG. 6A illustrates an example video decoding process in accordance with some embodiments.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system. In some embodiments, the method 600 is performed by a same system as methods 500 and 550 described above.

The system receives (602) a video bitstream (e.g., a coded video sequence) comprising a plurality of frames. The system selects (604) a primary reference frame from a set of reference frames for a current frame of the plurality of frames. For example, the system may use a primary reference frame derived at the decoding component, or may use a signaled primary reference frame. When the primary reference frame has less than a threshold number of tiles (606): the system selects (608) a secondary reference frame from the set of reference frames, and initializes (610) a current frame context for the current frame by performing a weighted average of respective contexts from the primary reference frame and the secondary reference frame. When the primary reference frame has more than the threshold number of tiles, the system initializes (612) the current frame context for the current frame without using the secondary reference frame. In some embodiments, when the primary reference frame has more than the threshold number of tiles, the system initializes the current frame context using a weighted average of respective contexts from multiple tiles of the primary reference frame. In some embodiments, the system entropy decodes one or more syntax elements for the current frame using the current frame context. In some embodiments, the system reconstructs the current frame using information of the one or more syntax elements. In this way, when there are less than or equal to N (N is a positive integer) tiles in one frame, the weighted averaging of multiple frame CDFs from the reference frame buffer may be used to initialize the frame context for current frame.

In some embodiments, the weighting factor for weighted averaging multiple reference frame's context can be predefined, implicitly derived, or explicitly signaled. In some embodiments, only one predefined weighting factor is used. In some embodiments, multiple predefined weighting factors are supported, and the selection of the predefined weighting factors may depend on the distance between current frame and reference frame, and/or the QP values of the reference frame, and/or the QP value difference between the current frame and reference frame. In some embodiments, the weighting factor is proportional to the distance between the current frame and reference frame. As an example, if the distance between the first reference frame and current reference frame is 3, and the distance between the second reference frame and current reference frame is 1, then weighting factor ¼ is assigned to the first reference frame, and weighting factor ¾ is assigned to the second reference frame.

In some embodiments, a larger weight is assigned to one reference frame when this reference frame is closer to the current frame. In some embodiments, the weighting factors for averaging multiple reference frame's context may also depend on the syntax elements. In some embodiments, equal weighting factors are assigned to one set of syntax elements, and unequal weighting factors are assigned to the other set of syntax elements. In some embodiments, unequal weighting factors are assigned to the motion vector related syntaxes. In some embodiments, the equal weighting factor is always applied to one set of syntax elements, and the signaled or derived weighting factor is only applied to the second set of syntax elements. As an example, the motion vector related syntaxes are included in the second set of syntax elements.

In some embodiments, a previously-coded syntax element may be used to determine the weighting factors for the current syntax element. In some embodiments, multiple predefined weighting factors are supported, and the selection of the predefined weighting factors may be explicitly signaled into sequence, frame, slice, and/or tile level.

In some embodiments, the supported weighting factors may be [½, ½], [¼, ¾], or [⅛, ⅞], and the index of the supported weighting factors is signaled into the bitstream. In one embodiment, when there are multiple reference frames in the reference frame buffer, the decision on which two (or more than two) reference frame's probability model are employed to perform the weighted average can be implicitly determined or explicitly signaled.

In some embodiments, when there are multiple reference frames in the reference frame buffer, at least one of the reference frames is implicitly determined based on the coded information. In some embodiments, when weighted averaging method is used to get the initialized value of current frame's probability model, one of the selected reference frames is set to primary reference frame or derived primary reference frame. In some embodiments, when weighted averaging method is used to get the initialized value of current frame's context, one of the selected reference frames is set to primary reference frame or derived primary reference frame, and the second reference frame is set as the reference frame with lowest index in the reference buffer, and the second reference frame is not equal to the first reference frame. In some embodiments, the selection of the second reference frame is signaled into the bitstream.

In some embodiments, when there are multiple reference frames in the reference frame buffer, the selection of these two (or more than two) references frames is explicitly signaled into the bitstream. In some embodiments, when there are multiple reference frames in the reference frame buffer, only a subset of the combinations of two (or more than two) reference frames is allowed and signaled into the bitstream. In some embodiments, when there are multiple reference frames in the reference frame buffer, the index of each reference frame in the reference frame buffer needs to be equal to or smaller than one threshold T1. As an example, T1 may be set to 2. In some embodiments, when there are multiple reference frames in the reference frame buffer, the reference frame distances with current frame needs to be equal or smaller than one threshold T2.

In some embodiments, the decision on whether to use the weighted average of multiple reference frame's probability model as the initialized value of current frame's contexts is implicitly determined based on the coded information. In some embodiments, the weighted average may only be applied to some of symbol probability models in the frame probability model. In some embodiments, coded information used for determining whether to use the weighted average of multiple reference frame's context may include, but not limited to one or more bypass coded symbols in high level syntax (HLS). In some embodiments, the weighted average may only be applied to some of symbol probability models in the frame probability model.

In some embodiments, when the primary reference frame is equal to the derived primary reference frame, the weighted average of multiple reference frame's context is applied. Otherwise, only the frame probability model of primary reference frame is used for current frame.

In some embodiments, when the primary reference frame is not equal to the derived primary reference frame, the weighted average of multiple reference frame's context is applied. Otherwise, only the frame probability model of primary reference frame is used for current frame.

In some embodiments, when there is more than one reference frame in the reference frame buffer, the weighted average of multiple reference frame's context is applied. Otherwise, only the frame probability model of primary reference frame is used for current frame.

In some embodiments, when there are multiple reference frames in the reference frame buffer and the difference of the distance between the selected two reference frames and current frame is smaller than one threshold T, the weighted average of multiple reference frame's context is applied. Otherwise, only the frame probability model of primary reference frame is used for current frame.

In some embodiments, when there are multiple reference frames in the reference frame buffer and all the reference frames are from the same side of current frame, the weighted average of multiple reference frame's context is applied. Otherwise, only the frame probability model of primary reference frame is used for current frame.

In some embodiments, when are multiple reference frames in the reference frame buffer and at least two reference frames are from the same side of current frame, the weighted average of multiple reference frame's context is applied. Otherwise, only the frame probability model of primary reference frame is used for current frame.

In some embodiments, the decision on whether to use the weighted average of multiple reference frame's context as the initialized value of current frame's contexts is explicitly signaled or conditionally signaled into the bitstream. In some embodiments, one flag is signaled at the frame/tile/ slice level to indicate whether to use the weighted average of multiple reference frame's context or the primary reference frame's context as initialization value of current frame's context. In some embodiments, the decision on whether to use the weighted average of multiple reference frame's context as the initialized value of current frame's contexts is conditionally signaled into the bitstream based on the coded information.

In some embodiments, when the primary reference frame is equal to (or not equal to) a predefined reference frame, one flag is signaled at the frame/tile/slice level to indicate whether to use the weighted average of multiple reference frame's context or the primary reference frame's context as initialization value of current's frame's context. In some embodiments, this predefined reference frame is the derived primary reference frame.

In some embodiments, when the reference frames in the reference frame buffer are not from the same side of current frame, one flag is signaled at the frame/tile/slice level to indicate whether to use the weighted average of multiple reference frame's context or the primary reference frame's context as initialization value of current's frame's context.

In some embodiments, when the difference of the number of frames from the two sides are larger/smaller than one threshold, one flag is signaled at the frame/tile/slice level to indicate whether to use the weighted average of multiple reference frame's context or the primary reference frame's context as initialization value of current's frame's context.

The selection of multiple reference frames may be derived based on a predefined rule. In some embodiments, when there are multiple reference frames in the reference frame buffer, and one of the reference frames is key frame (or intra frame), then this key (or intra) frame may be selected as one of the reference frames for generating the weighted average of frame's probability model.

In some embodiments, when the key (or intra) frame is selected as the derived primary reference frame or primary reference frame, then the weighted average of multiple reference frame's probability model is not applicable. In some embodiments, when the key (or intra) frame is selected as the derived primary reference frame or primary reference frame, then the weighted average of multiple reference frame's probability model may be applicable. In some embodiments, when the key (or intra) frame is present in the reference frame buffer, the weighted averaging of multiple reference frame's probability model may be applied. In some embodiments, when there are multiple reference frames in the reference frame buffer, and one of the reference frames selected for weighted averaging is assigned as the primary reference frame or the derived primary reference frame.

In some embodiments, when there are multiple reference frames in the reference frame buffer, one of them selected for weighted averaging is assigned as the derived primary reference frame (or primary reference frame), and the other one is assigned as the reference frame which is from the same direction as the derived primary reference frame. If there is no other reference frame from the same direction as derived primary reference frame, the weighted averaging of multiple reference frames is not applicable.

In some embodiments, if there are multiple reference frames in the reference frame buffer located at the same direction with the derived primary reference frame (or primary reference frame), the reference frame with the lowest rank index in the reference frame buffer (or the re-ordered reference frame buffer) is selected as the second reference frame. In some embodiments, if there are multiple reference frames in the reference frame buffer located at the same direction with the derived primary reference frame (or primary reference frame), the reference frame which is closest to the derived primary reference frame (primary reference frame) is selected as the second reference frame. In some embodiments, when there are multiple reference frames in the reference frame buffer, one of them selected for weighted averaging is assigned as the derived primary reference frame or primary reference frame, and the other one is assigned as the reference frame that is located closest to the primary reference frame or the derived primary reference frame or current frame. In some embodiments, when there are multiple reference frames in the reference frame buffer, one of them selected for weighted averaging is assigned as the derived primary reference frame or primary reference frame, and the other one is assigned as the reference frame that has the closest temporal level ID with the current frame or the primary reference frame.

In some embodiments, when there are multiple reference frames in the reference frame buffer and primary reference frame is not equal to derived reference frame, then weighted averaging of two reference frames' probability model can be applicable. In some embodiments, when there are multiple reference frames in the reference frame buffer and primary reference frame is not equal to derived reference frame, the primary reference frame and the derived primary reference frame are selected to generate the weighted average of frame probability model. In some embodiments, when there are multiple reference frames in the reference frame buffer and primary reference frame is equal to derived reference frame, then weighted averaging of two reference frames' probability model may be applicable. In some embodiments, when there are multiple reference frames in the reference frame buffer and primary reference frame is equal to derived reference frame, one of the selected reference frames is set to derived primary reference frame, and the other one is set to one reference frame which is located at the same direction with the derived primary reference frame.

In some embodiments, when there are multiple reference frames in the reference frame buffer and primary reference frame is equal to derived reference frame, one of the selected reference frames is set to derived primary reference frame, and the other one is set to the reference frame with the lowest rank index in the reference frame buffer (or the re-ordered reference frame buffer), located at the same direction with the derived primary reference frame. In some embodiments when there are multiple reference frames in the reference frame buffer, a set of predefined rules can be applied sequentially to select two reference frames for generating the weight average of the frame's probability model.

In some embodiments, the derived primary reference frame or primary reference frame is selected as the first selected frame for generating the weighted average. Two rules may be applied to find the second reference frame. Firstly, check whether there is one reference frame in the reference buffer with the same direction as the first selected frame. When this condition is satisfied, this reference frame is selected as the second reference frame. Otherwise, check the distance of reference frames in the reference frame buffer (or the re-ordered reference frame buffer), and select the reference frame with the closest distance with the first reference frame.

When the primary reference frame has multiple tiles, the final CDFs of the largest tile (which may also be the last tile) may be used for initialization of CDFs models for current frame or tile. The final CDFs along with the reconstructed primary reference frame may be stored in the decoded picture buffer (DPB).

In some embodiments, when there are less than or equal to N (N is a positive integer) tiles in one frame, the weighted averaging of multiple frame CDFs from the reference frame buffer is used to initialize the frame context for current frame. In some embodiments, N is set to 1 or 2. In some embodiments, when there are less than or equal to N tiles in one frame, an HLS is signaled to indicate that the weighted average of multiple frames' contexts is used to initialize the context for the current frame. In some embodiments, when there are less than or equal to N tiles in one frame, an HLS flag is used to switch among disabling CDFs initialization with reference frames, using only the primary reference frame, using only the secondary reference frame, or combining both primary and secondary reference frames for the CDFs initialization. In some embodiments, when there are more than N tiles in one frame, the default value of the context for current frame/tile may also be averaged with the updated context of the tile to generate the final CDF.

In some embodiments, when there are more than N tiles in one frame, it is proposed to use a weighted average of final CDFs of all or some of the tiles in the primary reference frame to initialize CDFs for current frame. Otherwise, when there are less than or equal to N tiles in one frame, the weighted averaging of multiple frame CDFs from the reference frame buffer may be used to initialize the frame context for current frame.

In some embodiments, when there are multiple tiles in one frame, the weighted average is applied to the multiple tiles within the current frame to generate the stored frame context for the current frame. The weighting factor may depend on the coded size of each tile. In some embodiments, there are some predefined weighting factors, and the selection of the multiple predefined weighting factors may depend on the ratio of the coded size of different tiles. As an example, the predefined weighting factors can be [½, ½], [¼, ¾], [⅛, ⅞], [⅜, ⅝].

In some embodiments, if there are multiple tiles in one frame, each tile may decide whether to use the frame context stored in the reference frame buffer or use the default CDF value as the start of context.

In some embodiments, if there are multiple tiles in one frame, each tile may decide whether to use the frame context stored in the reference frame buffer or use the weighted average of multiple reference frames as the start of frame context.

In some embodiments, a weighted average of final CDFs of all or some of the tiles in the primary reference frame are used to initialize CDFs for current frame or tile or slice. In an example, if K tiles are used for coding the primary reference frame, the weighted average may be obtained by using CDFs from M tiles for generating the final stored CDFs, wherein M<=K. Here K<=16. The final stored CDF may be used as the reference for the subsequent frame for context initialization. In some embodiments, the maximum number of M can be a predefined value or a signaled value in the HLS, such as sequence, frame, tile, and/or slice header. In some embodiments, only one tile from each tile row or tile column is employed for doing the weighted average of the final CDFs.

In some embodiments, the default value of the context for current frame/tile may also be averaged with the updated context of the tile to generate the final CDF. In some embodiments, the weights used for averaging may depend on the qindex (or quantization parameter for each tile).

In some embodiments, equal weights are used for averaging the CDFs from M tiles. In some embodiments, the weights may depend on the resolution of the tiles (i.e. width and height of the tile).

In some embodiments, the weights may depend on the relative position of the tiles in the frame. In some embodiments, the weights vary for different syntaxes. In some embodiments, an HLS flag may be used in the sequence header to enable or disable the weighted averaging.

In some embodiments, depending on the temporal layer id of the frame, weighted averaging may be disabled or enabled implicitly. In some embodiments, an HLS flag may be used in the frame header to signal the weights to be used for each tile. In an example, an index to a look up table may be signaled in the frame header. The index will point to the actual weights used.

In some embodiments, a weighted average of final CDFs of all or some of the tiles in a secondary reference frame are used to initialize CDFs for current frame or tile. In some embodiments, the aspects described above with respect to the primary reference frame are also applicable to secondary reference frame.

In some embodiments, a combination of aspects described above with respect to the primary and secondary references frames is used to initialize CDFs for current frame or tile. In some embodiments, the combination can be achieved using a weighted averaging of final CDFs obtained from primary and secondary reference frames.

In some embodiments, an HLS flag is used to switch between disabling CDFs initialization with reference frames, using only the primary reference frame, using only the secondary reference frame, or combining both primary and secondary reference frames for the CDFs initialization. In some embodiments, an HLS flag is signaled to switch between the weighted average of the context of multiple tiles within the frame and the weighted average of the frame context of multiple frames. In some embodiments, the combination can be a weighted average based on the distance of the primary and secondary reference frame to the current frame.

In some embodiments, a weighted average of the two reference frames' contexts in the reference frame buffer is used to initialize the context for current frame. For example, one frame may be the primary reference frame in the reference frame buffer. In some embodiments, the reference frame with the lowest index in the reference frame buffer, positioned on the same side of primary reference frame is used as the second reference frame.

In some embodiments, if the primary reference frame is signaled, the weighted average of optimal primary reference frame's context and derived primary reference frame's context (if available) is used for initializing the contexts. Otherwise, the weighted average of derived primary and secondary reference frame's contexts is used.

Figure 6B:
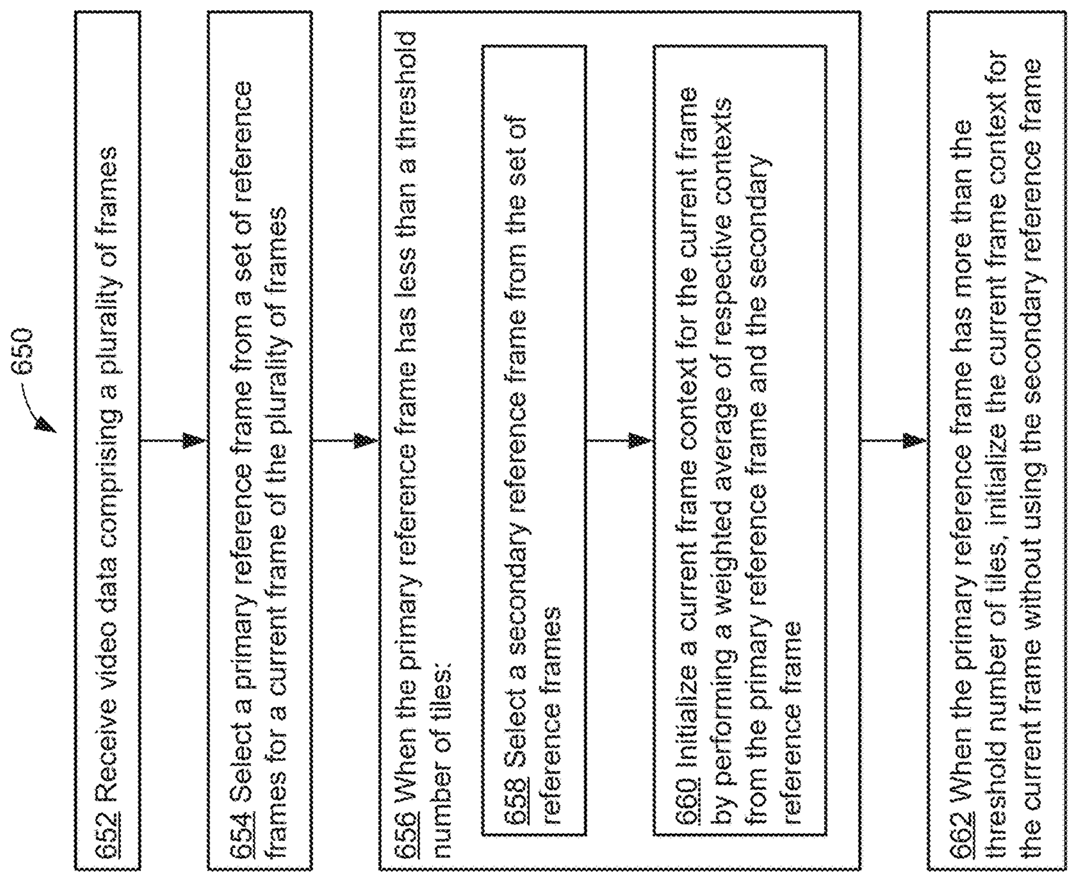
FIG. 6B illustrates an example video encoding process in accordance with some embodiments.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. In some embodiments, the method 650 is performed by a same system as the method 600 described above.

The system receives (652) video data (e.g., a source video sequence) comprising a plurality of frames. The system selects (654) a primary reference frame from a set of reference frames for a current frame of the plurality of frames. When the primary reference frame has less than a threshold number of tiles (656), the system selects (658) a secondary reference frame from the set of reference frames, and initializes (660) a current frame context for the current frame by performing a weighted average of respective contexts from the primary reference frame and the secondary reference frame. When the primary reference frame has more than the threshold number of tiles, the system initializes (660) the current frame context for the current frame without using the secondary reference frame. In some embodiments, the system entropy encodes one or more parameters for the current frame using the current frame context.

Example Primary Reference Frame Selection

In some embodiments, for the current coding frame A, a list of reference frames is defined, and each reference frame's contexts are stored along with its frame data. In some embodiments, in both the encoder and decoder, a primary reference frame is derived for A based on the frame-level qindex (or QP parameter value) and the frame distances to the reference may be ranked based on most recently coded (as a second tie-break). This process may involve (1)-(3) as follows. (1) From references with qindex less than or equal to A's qindex, select reference R1 that has the closest qindex to A's qindex. If more than one references meet above condition, choose the one with the closest distance to A. If more than one references meet above conditions, the one that is coded later is chosen, which is likely to have the most recent updated frame contexts. (2) Similarly, from references with qindex greater than or equal to A's qindex, select reference R2 that has the closest qindex to A's qindex. If more than one references meet above condition, choose the one with the closest distance to A. If more than one references meet above conditions, the one that is coded later is chosen, which is likely to have the most recent updated frame contexts. (3) If R1 exists, choose R1, otherwise, choose R2. The chosen reference is A's derived primary reference frame.

In some embodiments, in the encoder, optimal selection of the primary reference frame is further conducted. The process may involve (1) and (2) as follows. (1) After the frame encoding, search through reference frames. For each reference, use its frame contexts as A's starting frame contexts, and run A's entropy coding. Record the resulting coded frame size. (2) Select the reference frame with minimum coded frame size as A's optimal primary reference frame.

In some embodiments, the primary reference frame is signaled. This process may involve (1) and (2) as follows. (1) If A's derived primary reference frame is the same as A's optimal primary reference frame, signal "0", otherwise, signal "1" in the bitstream. Here, "0" indicates to use the derived primary reference frame, and "1" indicates to use the optimal primary reference frame. (2) If "1" is signaled above, then signal the optimal primary reference frame in the uncompressed frame header using 3 bits.

Example Primary and Secondary Reference Frame Selection

In some embodiments, a secondary reference frame is selected and signaled so that a weighted average of primary and secondary reference frame's probability model may serve as the initialized value for contexts of current frame. For each reference frame's probability model, it may include but not limited to context probability value, context state, and/or context updating rate. The selection of primary and secondary reference frames may be derived based on a predefined rule.

In some embodiments, the selection and signaling of primary and secondary reference frames involve (I)-(IV) as follows.

(I) For the current coding frame A, a list of reference frames is defined. Each reference frame's contexts are stored along with its frame data.

(II) In both the encoder and decoder, a primary and secondary reference frame is derived for A based on a frame-level qindex (or QP parameter value) and the frame distances. The process may involve (1)-(3) as follows. (1) From references with <=A's qindex, select a pair of references (R1, R2), if available, that have the closest qindex to A. If more than 2 reference has the same qindex, choose (R1, R2) with the closest distance to A. If more than 2 reference has the same qindex and closest distance to A, the (R1, R2) that is coded later are chosen, which are likely to have the most recent updated frame contexts. (2) Similarly, find references (R3, R4) with a higher & closest qindex. (3) If (R1, R2) exists, choose (R1, R2), otherwise, choose (R3, R4). The chosen pair of references are A's derived primary and secondary reference frames.

(III) In the encoder, optimal selection of the primary and secondary reference frame is further conducted. The process may involve (1)-(2) as follows. (1) After the frame encoding, search through reference frames. For each reference, use its frame contexts as A's starting frame contexts, and run A's entropy coding. Record the resulting coded frame size. (2) Select the best two reference frames, if available, with minimum coded frame sizes as A's optimal primary and secondary reference frame.

(IV) The encoder signals the primary and secondary reference frames. The process may involve (1)-(4) as follows. (1) If A's derived primary reference frame is the same as A's optimal primary reference frame, signal "0", otherwise, signal "1" in the bitstream. Here, "0" indicates to use the derived primary reference frame, and "1" indicates to use the optimal primary reference frame. (2) If "1" is signaled above, then signal the optimal primary reference frame in the uncompressed frame header using 3 bits. (3) If A's derived secondary reference frame is the same as A's optimal secondary reference frame, signal "0", otherwise, signal "1" in the bitstream. Here, "0" indicates to use the derived secondary reference frame, and "1" indicates to use the optimal secondary reference frame. (4) If "1" is signaled above, then signal the optimal secondary reference frame in the uncompressed frame header using 3 bits.

In some embodiments, when only two reference frames are available to the encoder or decoder, the primary reference frame is selected and signaled using steps described previously in the Example Primary Reference Frame Selection section. In some of these embodiments, the selection and signaling of secondary reference frame are skipped.

In one embodiment, an HLS flag (e.g., an uncompressed sequence or frame level flag) may be used to control the selection and signaling of secondary reference frame. In an example, if the HLS flag is "0", the selection and signaling of secondary reference frame may be skipped. In this case, only the primary reference frame is selected and signaled using steps described in Section 1 and weighted average of context probability models are not used for initialization (e.g., only primary reference frame contexts are used for initialization). In another example, if the HLS flag is "1", a weighted average of context probabilities of derived secondary reference frame and the primary reference frame selected and signaled using steps described in Section 1 models are used for initialization. In another example, if the HLS flag is “2”, a weighted average of context probabilities of selected and signaled primary and secondary reference frame models are used for initialization.

In some embodiments, the step (II) described previously is modified to incorporate temporal scalability. In some embodiments, in both the encoder and decoder, a primary and secondary reference frame for A is derived based on the frame-level qindex (or QP parameter value), frame distances, and temporal layer id of the current frame. This process may involve (1)-(3) as follows. (1) From references with <=A’s qindex and <=A’s temporal_layer_id, select a pair of references (R1, R2), if available, that have the closest qindex to A. If more than 2 reference has the same qindex, choose (R1, R2) with the closest distance to A. If more than 2 reference has the same qindex and closest distance to A, the (R1, R2) with closest temporal_layer_id to A are chosen. If more than 2 reference has the same qindex, closest distance to A and temporal_layer_id to A the (R1, R2) that is coded later are chosen (which are likely to have the most recent updated frame contexts). (2) Similarly, find references (R3, R4) with a higher and closest qindex. (3) If (R1, R2) exists, choose (R1, R2), otherwise, choose (R3, R4). The chosen pair of references are A’s derived primary and secondary reference frames.

In some embodiments, the weighted average of context probability model is used for only a subset of syntax elements. In an example, the weighted average of context probability model is used only for coefficient coding related syntax elements. In another example, the weighted average of context probability model is not applied to coefficient coding related syntax elements. In another example, the weighted average of context probability model is applied to a subset of coefficient coding related syntax elements. In another example the subset of coefficient coding related syntax elements may include, but not limited to, coefficient level related syntax, coefficient EOB-related syntax and coefficient sign related syntax. In another example, the weighted average of context probability model is used only for motion vector related syntax elements. In another example, the weighted average of frame context is only applied to the inter prediction mode and motion vector related syntax elements.

In some embodiments, the selection of primary and secondary reference frames may involve (I)-(IV) as follows. (I) For the current coding frame A, a list of reference frames is defined. Each reference frame’s contexts are stored along with its frame data.

(II) For derived primary and secondary reference frames, in both the encoder and decoder, a primary and secondary reference frame may be derived for A based on the frame level qindex (or QP parameter value) and the frame distances and other possible parameters. The process may involve (1)-(3) as follows. (1) From references with qindex less than A’s qindex, select a pair of references (R1, R2), if available, that have the closest qindex to A. If more than 2 references have the same qindex, choose (R1, R2) with the closest distance to A. If more than 2 references have the same qindex and closest distance to A, the (R1, R2) that is coded later are chosen, which are likely to have the most recent updated frame contexts. (2) From references with >=A’s qindex, select a pair of references (R3, R4), if available, that have the closest qindex to A. If more than 2 references have the same qindex, choose (R3, R4) with the closest distance to A. If more than 2 references have the same qindex and closest distance to A, the (R3, R4) that is coded later are chosen, which are likely to have the most recent updated frame contexts. (3) If (R1, R2) exists, choose (R1, R2), otherwise, choose (R3, R4). The chosen pair of references are A’s derived primary and derived secondary reference frames.

(III) In the encoder, optimal selection of the primary reference frame is further conducted. The process may involve (1)-(2) as follows. After the frame encoding, search through reference frames. For each reference, use its frame contexts as A’s starting frame contexts, and run A’s entropy coding. Record the resulting coded frame size. (2) Select the reference frame with minimum coded frame size as A’s optimal primary reference frame.

(IV) Signaling of the primary reference frame. In some embodiments, a binary flag is signaled. If A’s derived primary reference frame is the same as A’s optimal primary reference frame, signal “0”, otherwise, signal “1” in the bitstream. Here, “0” indicates to use the derived primary reference frame, and “1” indicates to use the reference frame signaled later. If “1” is signaled above, then signal the optimal primary reference frame in the uncompressed frame header using 3 bits.

In some embodiments, when the optimal primary reference frame is signaled in the bitstream, the optimal primary reference frame is not equal to derived primary reference frame and the weighted average of the probability model of optimal primary reference frame and derived primary reference frame is used to initialize the current frame probability model.

In some embodiments, the weighted average is applied only if optimal primary reference frame and derived primary reference frame are in the same direction. Otherwise, the current frame probability model is initialized with the probability model from optimal primary reference frame.

In some embodiments, the weighted average is applied only if relative distance between optimal primary reference frame and derived primary reference frame is smaller than one threshold (for example T2<={1, 2, 3, . . . , sub-GOP size}). Otherwise, the current frame probability model is initialized with the probability model from optimal primary reference frame.

In some embodiments, the weighted average is applied only if QP (e.g., qindex, quantization parameter, etc.) difference between optimal primary reference frame and derived primary reference frame is smaller than one threshold. Otherwise, the current frame probability model is initialized with the probability model from optimal primary reference frame.

In some embodiments, when the optimal primary reference frame is equal to the derived primary reference frame, the weighted average of derived primary reference frame and derived secondary reference frame is used to initialize the current frame probability model.

In some embodiments, the weighted average is applied only if derived primary reference frame and derived secondary reference frame are in the same direction. Otherwise, the current frame probability model is initialized with the probability model from the derived primary reference frame.

In some embodiments, the weighted average is applied only if relative distance between derived primary reference frame and derived primary reference frame is smaller than one threshold (for example T2<={1, 2, 3, . . . sub-GOP size}). Otherwise, the current frame probability model is initialized with the probability model from derived the primary reference frame.

In some embodiments, the weighted average is applied only if QP (e.g., qindex, quantization parameter, etc.) difference between derived primary reference frame and derived primary reference frame is smaller than one threshold. Otherwise, the current frame probability model is initialized with the probability model from derived the primary reference frame.

In some embodiments, when there are multiple tiles/slices in one frame, and the weighted average of multiple tiles'/slices' context are stored as the updated context of current frame, which may be used for the context of future frame. When averaging multiple tiles'/slices' context, one syntax may be signaled into the bitstream to indicate which tile's/slice's context are used for weighted average.

In some embodiments, on the encoder side, since the primary reference frame is undecided during the block-level RDO process, the frame context is initialized, and rate estimation is performed by setting the first reference frame as the derived primary reference frame. The second reference frame is set to the reference frame with the lowest index in the reference frame buffer, positioned on the same side of the derived reference frame.

As described previously, the encoding process may mirror the decoding processes described herein (e.g., selecting contexts and initializing probability models). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream comprising a plurality of frames; (ii) selecting a primary reference frame from a set of reference frames for a current frame of the plurality of frames; (iii) when the primary reference frame has less than a threshold number of tiles: (a) selecting a secondary reference frame from the set of reference frames; (b) obtaining respective contexts for the primary reference frame and the secondary reference frame; and (c) initializing a current frame context for the current frame by performing a weighted average of the respective contexts; (iv) when the primary reference frame has more than the threshold number of tiles, initializing the current frame context for the current frame without using the secondary reference frame; (v) entropy decoding one or more syntax elements for the current frame using the current frame context; and (vi) reconstructing the current frame using information of the one or more syntax elements. For example, when there are less than or equal to N (N is a positive integer) tiles in one frame, the weighted averaging of multiple frame contexts from a reference frame buffer may be used to initialize the frame context for current frame.

(A2) In some embodiments of A1, the threshold number of tiles is 2. For example, N may be set to 1 or 2.

(A3) In some embodiments of A1 or A2, the method further includes parsing a syntax element from a high-level syntax to determine whether weighted averaging of multiple reference frames is enabled for the current frame, wherein the current frame context for the current frame is initialized by performing the weighted average of the respective contexts when the syntax element indicates that weighted averaging of multiple reference frames is enabled for the current frame. For example, when there are less than or equal to N tiles in one frame, a high-level syntax (e.g., at a sequence level) is signaled to indicate that the weighted average of multiple frames' contexts is used to initialize the context for the current frame.

(A4) In some embodiments of A3, the syntax element indicates whether to use zero reference frames, one reference frame, or multiple reference frames to initialize the current frame context for the current frame. For example, when there are less than or equal to N tiles in one frame, a high-level syntax flag is used to switch among disabling CDFs initialization with reference frames, using only the primary reference frame, using only the secondary reference frame, or combining both primary and secondary reference frames for the CDFs initialization.

(A5) In some embodiments of any of A1-A4, initializing the current frame context for the current frame without using the secondary reference frame comprises initializing the current frame context by performing a weighted average of a default value and a respective context for a tile of the primary reference frame. For example, when there are more than N tiles in one frame, the default value of the context for current frame/tile may also be averaged with the updated context of the tile to generate the final CDF.

(A6) In some embodiments of any of A1-A4, initializing the current frame context for the current frame without using the secondary reference frame comprises initializing the current frame context by performing a weighted average of respective contexts from multiple tiles of the primary reference frame. For example, when there are more than N tiles in one frame, a weighted average of final CDFs of all or some of the tiles in the primary reference frame may be used to initialize CDFs for the current frame. Otherwise, when there are less than or equal to N tiles in one frame, the weighted averaging of multiple frame CDFs from the reference frame buffer may be used to initialize the frame context for the current frame.

(A7) In some embodiments of A6, respective weights for the weighted average of respective contexts from multiple tiles of the primary reference frame are based on a coded size of the multiple tiles. For example, when there are multiple tiles in one frame, the weighted average is applied to the multiple tiles within the current frame to generate the stored frame context for the current frame. The weighting factor may depend on the coded size of each tile.

(A8) In some embodiments of A7, respective weights for the weighted average of respective contexts from multiple tiles of the primary reference frame are selected from a set of predefined weights. For example, there may be multiple predefined weighting factors, and the selection of the multiple predefined weighting factors may depend on the ratio of the coded size of different tiles.

(A9) In some embodiments of A8, the respective weights for the weighted average of respective contexts from multiple tiles of the primary reference frame are equal. For example, the predefined weighting factors may be [½, ½], [¼, ¾], [⅛, ⅞], [⅜, ⅝], or other values.

(A10) In some embodiments of any of A1-A9, one or more first tiles of the current frame have parameters that are entropy coded using the current frame context, and one or more second tiles of the current frame have parameters that are coded without using the current frame context. For example, if there are multiple tiles in one frame, each tile of the current frame may use the frame context (e.g., stored in the reference frame buffer), or may use the default CDF value as the start of context.

(B1) In another aspect, some embodiments include a method (e.g., the method 650) of video encoding. In some embodiments, the method is performed at a computing system having memory and one or more processors. The method includes: (i) receiving video data (e.g., a source video sequence) comprising a plurality of frames; (ii) selecting a primary reference frame from a set of reference frames for a current frame of the plurality of frames; (iii) when the primary reference frame has less than a threshold number of tiles: (a) selecting a secondary reference frame from the set of reference frames; (b) obtaining respective contexts for the primary reference frame and the secondary reference frame; and (c) initializing a current frame context for the current frame by performing a weighted average of the respective contexts; (iv) when the primary reference frame has more than the threshold number of tiles, initializing the current frame context for the current frame without using the secondary reference frame; and (v) entropy encoding one or more parameters for the current frame using the current frame context. In some embodiments, the method includes signaling the entropy-encoded parameters and the encoded current frame in a video bitstream.

(B2) In some embodiments of B1, the threshold number of tiles is 2.

(B3) In some embodiments of B1 or B2, the method further includes signaling a syntax element in a high-level syntax to indicate whether weighted averaging of multiple reference frames is enabled for the current frame.

(B4) In some embodiments of B3, the syntax element indicates whether to use zero reference frames, one reference frame, or multiple reference frames to initialize the current frame context for the current frame.

(B5) In some embodiments of any of B1-B4, initializing the current frame context for the current frame without using the secondary reference frame comprises initializing the current frame context by performing a weighted average of a default value and a respective context for a tile of the primary reference frame.

(B6) In some embodiments of any of B1-B4, initializing the current frame context for the current frame without using the secondary reference frame comprises initializing the current frame context by performing a weighted average of respective contexts from multiple tiles of the primary reference frame.

(B7) In some embodiments of B6, respective weights for the weighted average of respective contexts from multiple tiles of the primary reference frame are equal.

(B8) In some embodiments of any of B1-B7, the method further includes encoding-side analogues of any of the features described above with respect to A1-A10.

(C1) In another aspect, some embodiments include a method of visual media data processing. In some embodiments, the method is performed at a computing system having memory and one or more processors. The method includes: (i) obtaining a source video sequence comprising a plurality of pictures; and (ii) performing a conversion between the source video sequence and a bitstream of visual media data, where the bitstream comprises a plurality of encoded frames; and where the format rule specifies that: (a) a primary reference frame is to be selected from a set of reference frames for a current frame of the plurality of frames; (b) when the primary reference frame has less than a threshold number of tiles: (1) a secondary reference frame is to be selected from the set of reference frames; (2) respective contexts are to be obtained for the primary reference frame and the secondary reference frame; and (3) a current frame context is to be initialized for the current frame by performing a weighted average of the respective contexts; (c) when the primary reference frame has more than the threshold number of tiles, the current frame context is to be initialized for the current frame without using the secondary reference frame; (d) one or more syntax elements are to be entropy decoded for the current frame using the current frame context; and (e) the current frame is to be reconstructed using information of the one or more syntax elements.

(D1) In another aspect, some embodiments include a method of video decoding. In some embodiments, the method is performed at a computing system having memory and one or more processors. The method includes: (i) receiving a video bitstream comprising a plurality of frames; (ii) selecting a primary reference frame from a set of reference frames for the current frame; (iii) for each tile in a plurality of tiles for a current frame of the plurality of frames: (a) when the primary reference frame has more than a threshold number of tiles, determining whether to apply tile averaging or frame averaging to initialize a context for the tile; (b) when using frame averaging to initialize the context for the tile: (1) selecting a secondary reference frame from the set of reference frames; (2) obtaining respective contexts for the primary reference frame and the secondary reference frame; and (3) initializing a context for the current frame by performing a weighted average of the respective contexts for the primary reference frame and the secondary reference frame; (c) when using tile averaging to initialize the context for the tile: (I) selecting two or more tiles from the primary reference frame; (II) obtaining respective contexts for the two or more tiles; and (III) initializing the context for the current frame by performing a weighted average of the respective contexts for the two or more tiles; (d) entropy decoding one or more syntax elements for the tile using the context; and (c) reconstructing the tile using information of the one or more syntax elements. For example, if there are multiple tiles in one frame, each tile of the current frame may use the frame context stored in the reference frame buffer or use the weighted average of multiple reference frames as the start of frame context.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., the methods 500, 550, 600, and 650, as well as A1-A10, B1-B8, C1, and D1 above). In another aspect, some embodiments include a non-transitory computer-readable storage medium storing one or more sets of instructions for execution by control circuitry of a computing system, the set(s) of instructions including instructions for performing any of the methods described herein (e.g., the methods 500, 550, 600, and 650, as well as A1-A10, B1-B8, C1, and D1 above).

Unless otherwise specified, any of the syntax elements described herein may be HLS. As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

- receiving a video bitstream comprising a plurality of frames;
- selecting a primary reference frame from a set of reference frames for a current frame of the plurality of frames;
- when the primary reference frame has less than a threshold number of tiles:
  - selecting a secondary reference frame from the set of reference frames;
  - obtaining respective contexts for the primary reference frame and the secondary reference frame; and
  - initializing a current frame context for the current frame by performing a weighted average of the respective contexts;
- when the primary reference frame has more than the threshold number of tiles, initializing the current frame context for the current frame without using the secondary reference frame;
- entropy decoding one or more syntax elements for the current frame using the current frame context; and
- reconstructing the current frame using information of the one or more syntax elements.

2. The method of claim 1, wherein the threshold number of tiles is 2.

3. The method of claim 1, further comprising parsing a syntax element from a high-level syntax to determine whether weighted averaging of multiple reference frames is enabled for the current frame, wherein the current frame context for the current frame is initialized by performing the weighted average of the respective contexts when the syntax element indicates that weighted averaging of multiple reference frames is enabled for the current frame.

4. The method of claim 3, wherein the syntax element indicates whether to use zero reference frames, one reference frame, or multiple reference frames to initialize the current frame context for the current frame.

5. The method of claim 1, wherein initializing the current frame context for the current frame without using the secondary reference frame comprises initializing the current frame context by performing a weighted average of a default value and a respective context for a tile of the primary reference frame.

6. The method of claim 1, wherein initializing the current frame context for the current frame without using the secondary reference frame comprises initializing the current frame context by performing a weighted average of respective contexts from multiple tiles of the primary reference frame.

7. The method of claim 6, wherein respective weights for the weighted average of respective contexts from multiple tiles of the primary reference frame are based on a coded size of the multiple tiles.

8. The method of claim 6, wherein respective weights for the weighted average of respective contexts from multiple tiles of the primary reference frame are selected from a set of predefined weights.

9. The method of claim 8, wherein the respective weights for the weighted average of respective contexts from multiple tiles of the primary reference frame are equal.

10. The method of claim 1, wherein one or more first tiles of the current frame have parameters that are entropy coded using the current frame context, and wherein one or more second tiles of the current frame have parameters that are coded without using the current frame context.

11. A method of video encoding performed at a computing system having memory and one or more processors, the method comprising:

- receiving video data comprising a plurality of frames;
- selecting a primary reference frame from a set of reference frames for a current frame of the plurality of frames;
- when the primary reference frame has less than a threshold number of tiles:
  - selecting a secondary reference frame from the set of reference frames;
  - obtaining respective contexts for the primary reference frame and the secondary reference frame; and
  - initializing a current frame context for the current frame by performing a weighted average of the respective contexts;

when the primary reference frame has more than the threshold number of tiles, initializing the current frame context for the current frame without using the secondary reference frame; and entropy encoding one or more parameters for the current frame using the current frame context.

12. The method of claim 11, wherein the threshold number of tiles is 2.

13. The method of claim 11, further comprising signaling a syntax element in a high-level syntax to indicate whether weighted averaging of multiple reference frames is enabled for the current frame.

14. The method of claim 13, wherein the syntax element indicates whether to use zero reference frames, one reference frame, or multiple reference frames to initialize the current frame context for the current frame.

15. The method of claim 11, wherein initializing the current frame context for the current frame without using the secondary reference frame comprises initializing the current frame context by performing a weighted average of a default value and a respective context for a tile of the primary reference frame.

16. The method of claim 11, wherein initializing the current frame context for the current frame without using the secondary reference frame comprises initializing the current frame context by performing a weighted average of respective contexts from multiple tiles of the primary reference frame.

17. The method of claim 16, wherein respective weights for the weighted average of respective contexts from multiple tiles of the primary reference frame are equal.

18. A non-transitory computer-readable storage medium storing a video bitstream that is generated by a video encoding method, the video encoding method comprising:

receiving video data comprising a plurality of frames;

selecting a primary reference frame from a set of reference frames for a current frame of the plurality of frames;

when the primary reference frame has less than a threshold number of tiles:

selecting a secondary reference frame from the set of reference frames;

obtaining respective contexts for the primary reference frame and the secondary reference frame; and initializing a current frame context for the current frame by performing a weighted average of the respective contexts;

when the primary reference frame has more than the threshold number of tiles, initializing the current frame context for the current frame without using the secondary reference frame; and entropy encoding one or more parameters for the current frame using the current frame context.

19. The non-transitory computer-readable storage medium of claim 18, wherein the video bitstream comprises the one or more entropy-encoded parameters and encoding information for the current frame.

20. The non-transitory computer-readable storage medium of claim 18, wherein the video bitstream comprises a syntax element in a high-level syntax that indicates whether weighted averaging of multiple reference frames is enabled for the current frame.

* * * * *